(12) United States Patent
Mody et al.

(10) Patent No.: US 8,670,721 B2
(45) Date of Patent: Mar. 11, 2014

(54) METHOD FOR COLLABORATIVE DISCRIMATION BETWEEN AUTHENTIC AND SPURIOUS SIGNALS IN A WIRELESS COGNITIVE NETWORK

(75) Inventors: Apurva N Mody, Lowell, MA (US);
Timothy X Brown, Boulder, CO (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 143 days.

(21) Appl. No.: 12/866,898

(22) PCT Filed: Dec. 8, 2009

(86) PCT No.: PCT/US2009/067175
§ 371 (c)(1),
(2), (4) Date: Aug. 10, 2010

(87) PCT Pub. No.: WO2010/068629
PCT Pub. Date: Jun. 17, 2010

(65) Prior Publication Data
US 2010/0317391 A1    Dec. 16, 2010

Related U.S. Application Data

(60) Provisional application No. 61/120,713, filed on Dec. 8, 2008.

(51) Int. Cl.
*H04B 17/00* (2006.01)
(52) U.S. Cl.
USPC ............ 455/67.11; 455/410; 370/252
(58) Field of Classification Search
None
See application file for complete search history.

(56) References Cited

U.S. PATENT DOCUMENTS

| | | | |
|---|---|---|---|
| 6,690,746 B1 * | 2/2004 | Sills et al. | 375/316 |
| 7,187,927 B1 | 3/2007 | Michell | |
| 7,424,268 B2 * | 9/2008 | Diener et al. | 455/62 |
| 7,756,058 B2 * | 7/2010 | Cordeiro et al. | 370/252 |
| 8,055,204 B2 * | 11/2011 | Livsics et al. | 455/67.11 |
| 8,069,216 B2 * | 11/2011 | He et al. | 709/207 |
| 8,184,653 B2 * | 5/2012 | Dain et al. | 370/431 |
| 8,326,313 B2 * | 12/2012 | McHenry et al. | 455/454 |
| 2003/0221114 A1 | 11/2003 | Hino et al. | |

(Continued)

OTHER PUBLICATIONS

PCT Search Report dated Feb. 3, 2010 of Patent Application No. PCT/US2009/067175 filed Dec. 8, 2009.

*Primary Examiner* — Nay A Maung
*Assistant Examiner* — Alejandro Rivero
(74) *Attorney, Agent, or Firm* — Maine Cernota & Rardin; Douglas Peter Burum; Daniel J. Long

(57) ABSTRACT

A WRAN discriminates between authentic incumbent and spurious/malicious signals by collaboratively sensing the frequency environment, classifying and fusing the sensed results, and categorizing each signal as valid or invalid. Embodiments categorize signals according to reports from at least two nodes, thereby increasing detection confidence and resisting denial-of-service attacks. A "voting-rule" can be applied whereby a signal is authentic only if it is detected by a specified percentage of the nodes. Some embodiments categorized signals by comparing sensed analog signal properties, such as amplitude, bandwidth, pulse width, mean, variance, modulation, standard deviation, moments, cumulants, and rise and fall times, with properties of known incumbents and/or known incumbent types. Sensed results can be weighted according to known node locations and/or local topology, sensed signal strengths, and comparisons of sensed analog features with corresponding features of known incumbents and/or known incumbent types in the same class.

20 Claims, 18 Drawing Sheets

(56) References Cited

U.S. PATENT DOCUMENTS

| | | |
|---|---|---|
| 2004/0028003 A1 | 2/2004 | Diener et al. |
| 2005/0032479 A1* | 2/2005 | Miller et al. ............... 455/67.11 |
| 2009/0135744 A1* | 5/2009 | Chaudhri et al. ............ 370/278 |
| 2009/0143019 A1* | 6/2009 | Shellhammer ............. 455/67.11 |
| 2009/0149208 A1* | 6/2009 | Huttunen et al. ............ 455/509 |
| 2010/0062718 A1* | 3/2010 | Zhou et al. ................. 455/67.11 |
| 2010/0069013 A1* | 3/2010 | Chaudhri et al. .......... 455/67.11 |
| 2010/0091715 A1* | 4/2010 | Akchurin et al. ............ 370/329 |

* cited by examiner

METHOD FOR COLLABORATIVE DISCRIMATION BETWEEN AUTHENTIC AND SPURIOUS SIGNALS IN A WIRELESS COGNITIVE NETWORK

RELATED APPLICATIONS

This application is a national phase application filed under 35 USC §371 of PCT Application No. PCT/US2009/067175, filed Dec. 8, 2009, which claims the benefit of U.S. Provisional Application No. 61/120,713, filed Dec. 8, 2008, herein incorporated by reference in its entirety for all purposes.

FIELD OF THE INVENTION

The invention relates to wireless networks, and more particularly to wireless networks using cognitive radio technology.

BACKGROUND OF THE INVENTION

Due to the heavy use of wireless communications in both civilian and military environments, there is often a shortage of available communication bandwidth. Traditionally, frequency "bands" have been assigned on a regional or global basis according to specific types of usage, such as commercial AM and FM radio, commercial VHF and UHF television, citizens band radio, licensed amateur radio, cellular telephony, satellite communication, ship-to-shore communication, aviation communication, military communication, and such like. Within many of these bands, such as commercial television and radio bands, specific frequencies or "channels" are assigned to individual entities, such as channels assigned to specific radio and television stations. Typically, such assignments provide for exclusive use of the assigned channel over a designated geographic region.

This traditional approach of exclusively reserving specific communication channels for specific entities generally leads to inefficient use of bandwidth, since at any given time, and in any given location, it is unlikely that all of the assigned channels will be in use. For example, a commercial television station may not have any broadcast coverage in certain portions of its assigned geographic region, and/or may broadcast only at certain times, leaving the assigned channel empty and unused at other locations and/or at other times.

One approach to taking advantage of this unused bandwidth is to use "Cognitive Radio" or "CR" technology. A cognitive radio is a radio that is capable of sensing its local bandwidth environment, so as to determine at any given time what frequencies are unused (so-called "white spaces") or underused (so-called "grey spaces"). Cognitive radios can then opportunistically use these white and/or grey spaces to communicate with each other without requiring a fixed, dedicated frequency assignment. It is fundamental to this approach that the cognitive radios function as secondary users of whatever channels they select. Therefore, they must effectively monitor the channels at all times for primary, or "incumbent" usage, and avoid any interference with the incumbents.

In particular, with reference to FIG. 1, cognitive radios can be used to form a so-called "Wireless Regional Area Network," or WRAN. In a WRAN, a base station CR 100 communicates with a plurality of subscriber CR's, or "subscribers" 102. In some implementations where the subscribers are not mobile, they are referred to as "Customer Premise Equipment" or "CPE" CR radios. The base station 100 determines which channels are available at any given time and communicates with the subscribers 102 to direct the usage thereof by the WRAN. In the simplest case, the base station 100 monitors and analyzes the bandwidth environment, selects an available channel, and broadcasts information on that channel to the subscriber radios 102. The base station 100 may also consult a database of known incumbents 104 and their assigned channels, regions, and patterns of usage. When a subscriber radio 102 wishes to join the WRAN, it surveys the local bandwidth environment until the base station 100 is located, and then identifies itself to the base station 100 and joins the network. Once the WRAN is established, the base station 100 coordinates switching of the WRAN to other frequencies from time to time, if and as needed. In FIG. 1, the incumbent 104 is illustrated as not presently broadcasting, thereby leaving its assigned channel free for use by the WRAN.

With reference to FIG. 2, the network architecture of a WRAN is a so-called "star" configuration, whereby communication within the network is always between the base station 100 and a subscriber 102.

As illustrated in FIG. 3, the WRAN of FIG. 1 is easily able to avoid interference with powerful incumbents 104 such as television or radio stations, which can be reliably detected by the base station 100, and/or which have well established channels, regions, and patterns of usage that are available to the base station through consultation with an appropriate database.

This approach is insufficient, however, because an incumbent source may be operating somewhere within the region served by the WRAN without being detectable by the base station, and without being documented in an available database. Not all incumbents transmit with high power. For example, an incumbent may be a television news van transmitting a new "feed" to a relay station, or a wireless microphone transmitting signals to a nearby amplifier. Such low power incumbents can be active within an area covered by a WRAN and yet be out of range of the base station, or shielded from the base station by an intervening building or hill. This is sometimes called the "hidden node" problem. An example of a wireless microphone 400 "hidden node" is illustrated in FIG. 4, where the microphone 400 is within range of a nearby subscriber 102 but not of the base station 100. An example of a television news van 500 is illustrated in FIG. 5, where the news van 500 is in range of several subscribers 102, but is blocked from detection by the base station 100 by an intervening building 502.

So as to avoid the hidden node problem, "collaborative sensing" is typically employed in a WRAN, whereby the subscribers 102 monitor their local broadcast environments and report their findings to the base station 100. In a typical collaborative sensing implementation, the base station 100 then avoids any frequency channel on which at least one subscriber 102 has detected a signal. This is sometimes called the "OR" rule of collaborative detection. As can be seen in FIG. 4, the wireless microphone 400 is easily detected by the nearest subscriber 102, which then informs the base station 100 not to use the channel being used by the wireless microphone 400. In some embodiments, certain incumbents such as wireless microphones use a "co-existent beaconing protocol" or "CBP" to transmit a "beacon" signal including a digital certificate that can be verified by the WRAN so as to increase the confidence with which it is detected. One example of the CBP approach is described in proposed IEEE standard 802.22.1. In some embodiments, the digital certificate is an elliptic curve cryptography or ECC-based implicit certificate.

With reference to FIG. 5, although the mobile television news van 500 is not known a priori to the base station, and is blocked from detection by the base station 100 due to an intervening building 502, collaborative detection by nearby subscribers 102 enables the WRAN to overcome the "hidden node" problem.

Nevertheless, while collaborative sensing is helpful for addressing the hidden node problem, it can have the unintended result that available frequency channels are mistakenly judged to be in use by incumbents, and are avoided by the WRAN when they could otherwise be used. For example, with reference to FIG. 4, a weak signal unintentionally emitted by a computer 402 or other electronic device may be detected by a nearby subscriber 102 and misinterpreted as a valid incumbent, thereby causing an available channel to be avoided. If the unintentional signal has a wide bandwidth, this unnecessary avoidance of frequency channels may have a significant impact on the operation of the WRAN.

In addition, under malicious circumstances, a conventional WRAN can be highly vulnerable to a denial of service or "DoS" attack, since a single, concealed, low power jamming source within detection range of even a single subscriber can easily inhibit transmission over the WRAN by creating the false impression that all frequency channels are occupied by incumbents and are therefore not available. An example is illustrated by FIG. 6, which illustrates a hidden, low power transmitter 600 deliberately broadcasting signals that are detectable by a nearby cognitive radio (CR3) 102 and cause the WRAN to falsely conclude that all frequency channels are fully occupied.

What is needed, therefore, is a method for avoiding interference by a WRAN with incumbent sources in a cognitive radio network, while at the same time minimizing the vulnerability of the WRAN to spurious signals and denial of service attacks.

SUMMARY OF THE INVENTION

A method is claimed for discriminating between an authentic incumbent signal and a spurious or malicious signal in a cognitive radio network. A plurality of cognitive radio "nodes" in the network collaborate by sensing their local bandwidth environments and providing their results to a signal authenticator, typically cooperative with the base station. The signal authenticator then analyzes all of the sensed results and decides therefrom whether or not to authenticate any detected candidate signals as valid incumbent signals.

In various embodiments, the signal authenticator attempts to classify each signal, for example as a television broadcast, a wireless broadcast, a Bluetooth transmission, and such like, according to at least one sensed property, for example the frequency channel upon which it is sensed. The signal authenticator then compares at least one additional sensed property of the signal, such as bandwidth or burst length, for consistency with known properties pertaining to the assigned class.

In various embodiments, the cognitive radios sense and report at least one analog property of each candidate signal. In some of these embodiments, the analog property is one of the following:

an average signal amplitude;
a signal bandwidth;
a frequency standard deviation;
a statistical feature such as mean, variance, or standard deviation;
a higher order statistic such as a moment, a cumulant, or a higher order spectrum coefficient;
a frequency variance;
a modulation;
a rise time;
a fall time; or
a pulse width.

The signal authenticator then compares this information with properties of incumbents known to be active in the region, and/or with generally known properties of valid types of incumbent, so as to improve the confidence with which the candidate signal is categorized as a valid incumbent or as an invalid signal.

In some embodiments, a "voting-rule" criterion is applied, whereby a signal is deemed to be incumbent if and only if it is detected by a specified percentage of the reporting cognitive radios. The voting rule helps to distinguish incumbent signals from background noise, as well as improving discrimination between valid incumbents and spurious or malicious signals.

In certain embodiments, the locations of the WRAN nodes are either known a priori or are reported to the signal authenticator by the nodes, and this information is used for "geo-location," whereby a broadcast location and/or a broadcast range of a candidate signal is estimated. The signal authenticator then compares the geo-location results with locations and ranges of incumbents known to be active in the region, as well as ranges of known types of valid incumbent, thereby increasing confidence in the signal categorization as valid or invalid.

In some embodiments, the signal authenticator applies weighting factors to data sensed by the nodes, so as to further improve the confidence with which each detected signal is categorized as valid or invalid. Weighting factors can depend on the strength with which a signal was detected, a "confidence metric" based on consistency of sensed properties with known properties of valid incumbent types, and/or anticipated effects of topological features surrounding the cognitive radios.

One general aspect of the present invention is a method for categorizing a candidate signal as one of an incumbent signal and not an incumbent signal, the candidate signal having been detected on a candidate frequency channel by at least one node of a wireless regional area network ("WRAN") of cognitive radios. The method includes each of a plurality of nodes in the WRAN sensing its surrounding frequency environment, each of the plurality of nodes preparing a sensing report at least reporting if the candidate signal has been detected, each of the plurality of nodes conveying its sensing report to a signal authenticator, and the signal authenticator categorizing the detected candidate signal as one of a valid incumbent and not a valid incumbent, the categorizing being according to an evaluation of the sensing reports that includes a synthesis of information from at least two of the sensing reports.

In some embodiments, the method includes, for each of the plurality of nodes in the WRAN, sensing its surrounding frequency environment includes sensing at least one analog property of each detected signal, and preparing a sensing report and conveying its sensing report includes conveying the at least one analog property to the signal authenticator. In some of these embodiments, the analog property is a signal amplitude, a signal bandwidth, a signal standard deviation, an amplitude variance, a mean, a variance, a standard deviation, a moment, a cumulant, a high order spectrum coefficient, a frequency variance, a rise time, a fall time, a modulation, a pulse width; or a television signal video pilot tone. And in other of these embodiments categorizing the detected candidate signal includes comparing the at least one analog property with a corresponding property of at least one of a known incumbent and a known type of incumbent.

In various embodiments categorizing the detected candidate signal includes categorizing the detected candidate signal as a valid incumbent signal if at least a specified percentage of the sensing reports report that the candidate signal has been detected. And in some of these embodiments the specified percentage is 50%.

In some embodiments a physical location of at least one of the plurality of nodes is known by the signal authenticator, and is included in the evaluation of the sensing reports. In some of these embodiments the physical location of the at least one node is known to the signal authenticator due to accessing by the signal authenticator of a database containing the physical location of the at least one node. And in some of these embodiments the physical location of the at least one node is reported to the signal authenticator by the at least one node. In some of these embodiments the physical location of the at least one node is determined by the at least one node using a geo-location apparatus at least cooperative with the at least one node, and in some of these embodiments the geo-location apparatus is a global positioning system apparatus.

In various embodiments where a physical location of at least one of the plurality of nodes is known by the signal authenticator, the physical location of the at least one node is compared with a detected candidate signal strength reported to the signal authenticator by the at least one node, the comparison being used by the signal authenticator to estimate a geographic characteristic of a source of the candidate signal, the geographic characteristic being one of a candidate source location and a candidate source broadcast range. In some of these embodiments the evaluation of the sensing reports includes comparing the estimated candidate source location with a source location of a known valid incumbent, comparing the estimated candidate source broadcast range with a source broadcast range of a known valid incumbent, and/or comparing the estimated candidate source broadcast range with a source broadcast range of a known type of valid incumbent.

In various embodiments, the evaluation of the sensing reports includes applying a weighting factor to a sensing report conveyed to the signal authenticator by one of the nodes in the WRAN. In some of these embodiments, the weighting factor is derived at least partly from a location of the node, a geographic feature applicable to the location of the node, a confidence factor reported by the node, the confidence factor being based at least in part on a signal strength with which the candidate signal is detected by the node, and/or a confidence metric reported by the node, the confidence metric being based at least in part on a comparison between an analog feature of the candidate signal detected by the node and a corresponding analog feature known to pertain to a valid type of incumbent.

In certain embodiments, the method further includes classifying the detected candidate signal as potentially belonging to at least one class of valid incumbent according to at least one detected characteristic of the candidate signal.

A second general aspect of the present invention is a method for categorizing a candidate signal as one of an incumbent signal and not an incumbent signal, the candidate signal having been detected on a candidate frequency channel by at least one node of a wireless regional area network ("WRAN") of cognitive radios. The method includes a node in the WRAN sensing its surrounding frequency environment, the node preparing a sensing report at least reporting that the candidate signal has been detected and reporting at least one analog property of the detected signal, the node conveying the sensing report to a signal authenticator, and the signal authenticator categorizing the detected candidate signal as one of a valid incumbent and not a valid incumbent, the categorizing being determined at least partly by an analysis of the analog property.

In various embodiments, the analog property is a signal amplitude, a signal bandwidth, a signal standard deviation, an amplitude variance, a mean, a variance, a standard deviation, a moment, a cumulant, a high order spectrum coefficient, a frequency variance, a rise time, a fall time, a modulation, a pulse width, and/or a television signal video pilot tone.

In certain embodiments the analysis of the analog property includes a comparison between the analog property and a corresponding analog property of at least one of a known valid incumbent and a known type of valid incumbent. And in some embodiments the method further includes classifying the detected candidate signal according to the analog property as potentially belonging to at least one class of valid incumbent.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
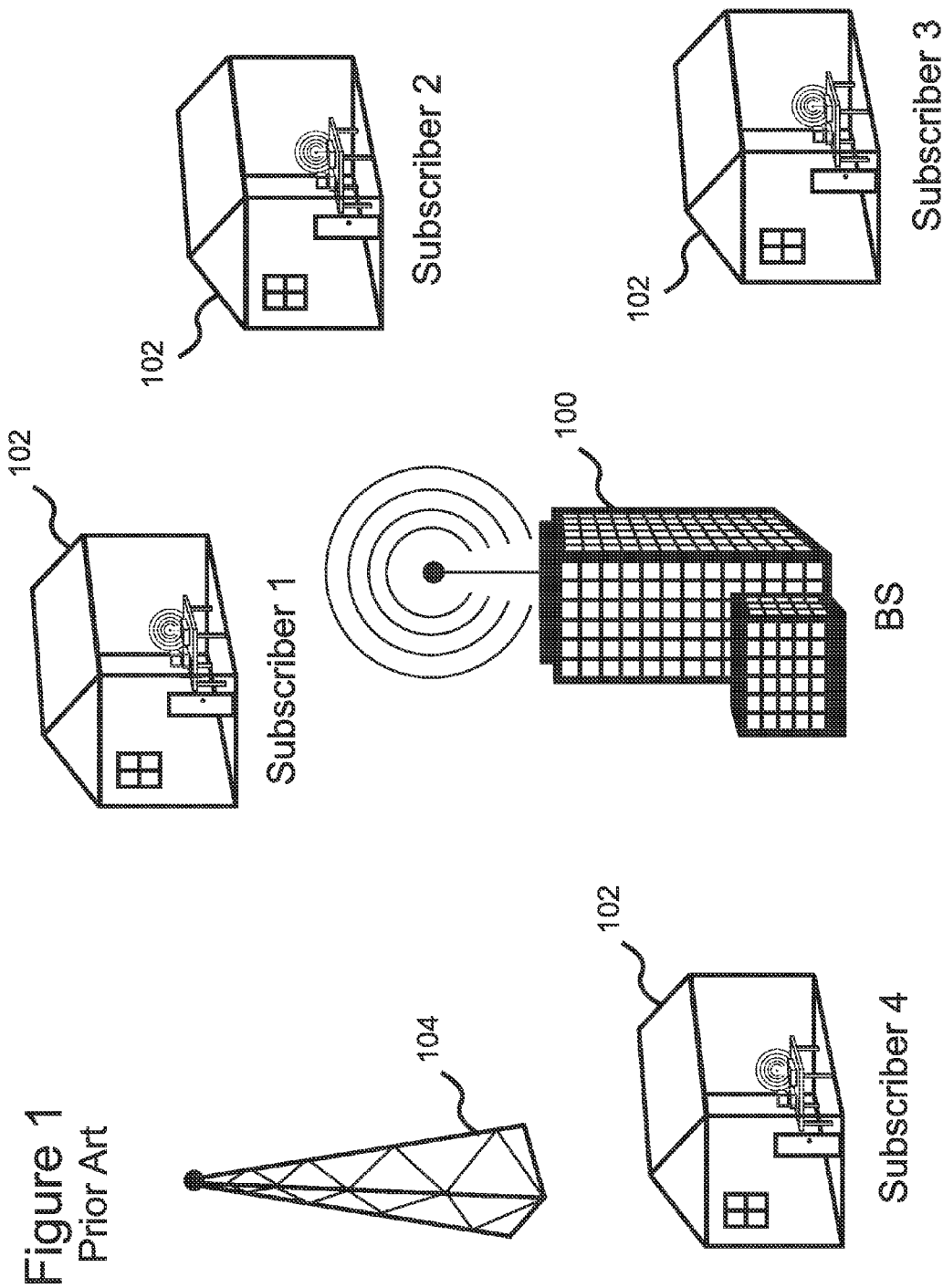
FIG. 1 illustrates a base station communicating with a plurality of subscribers on a frequency assigned to but not being used by an incumbent.
Figure 2:
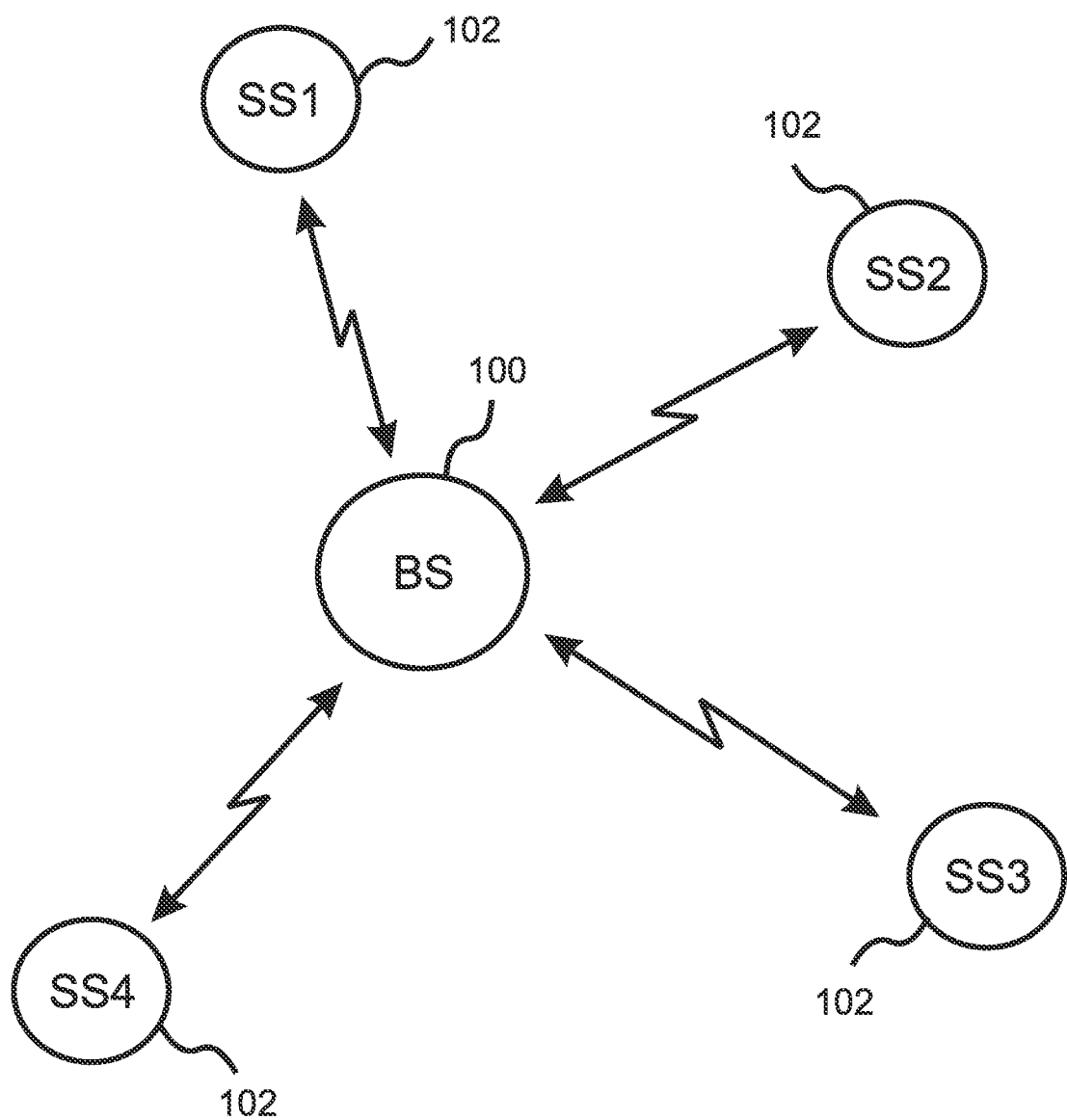
FIG. 2 illustrates the star topology of a wireless regional area network.
Figure 3:
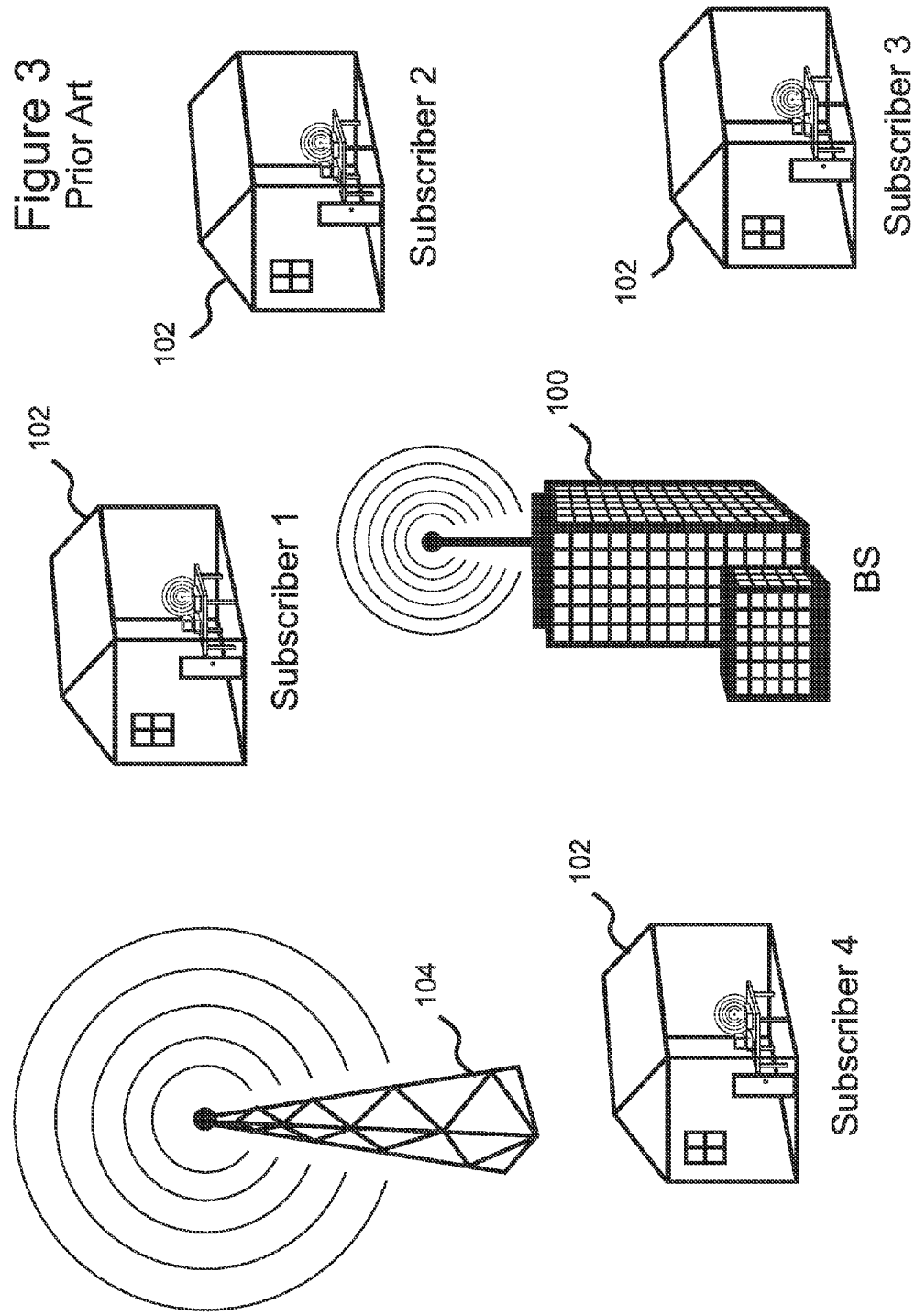
FIG. 3 illustrates the base station of FIG. 1 communicating with the plurality of subscribers after shifting to an alternate, unused frequency due to use by the incumbent of its assigned frequency.
Figure 4:
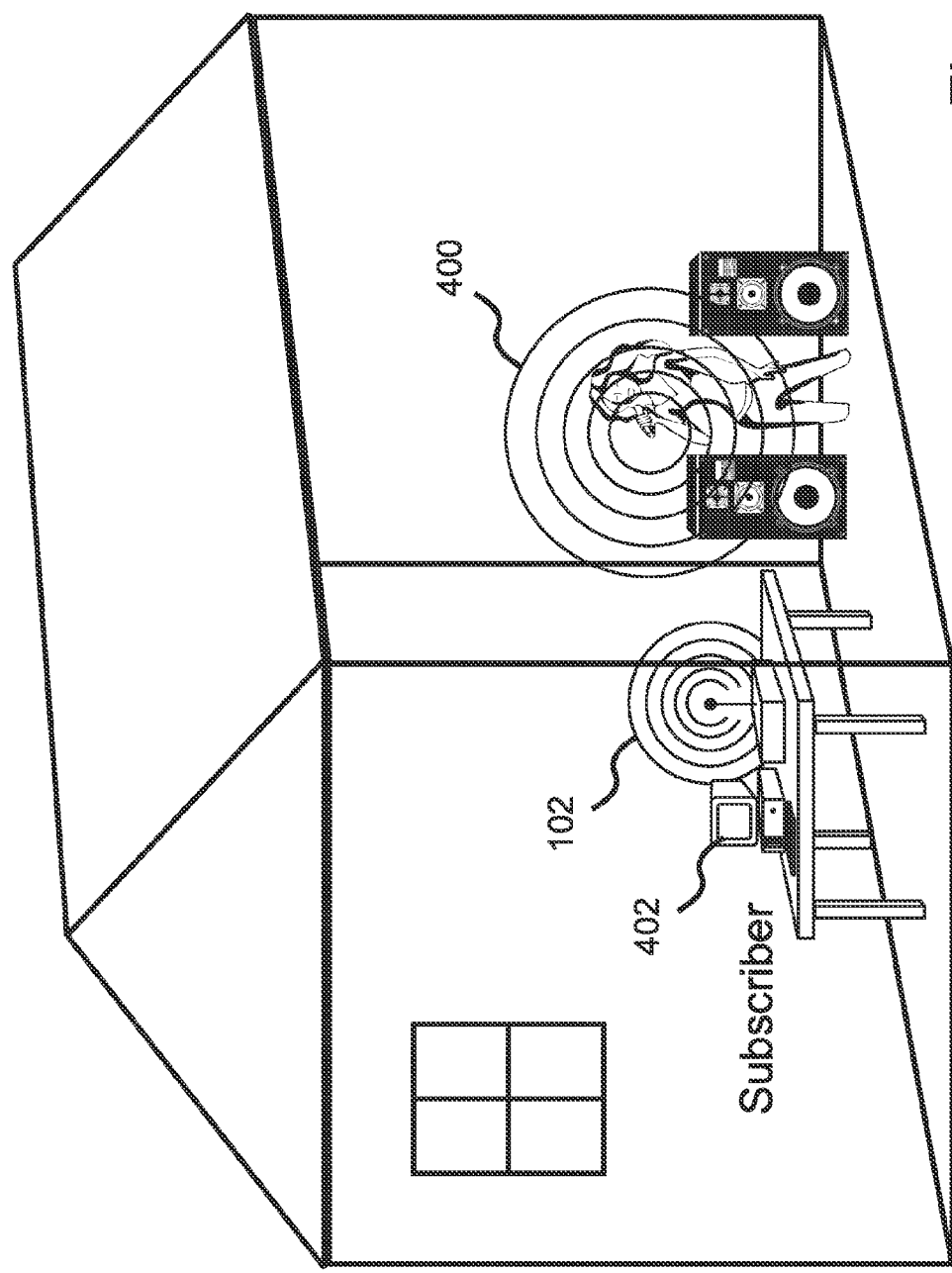
FIG. 4 illustrates a subscriber having detected a nearby wireless microphone, and thereby having caused the WRAN to shift to a non-interfering frequency channel.
Figure 5:
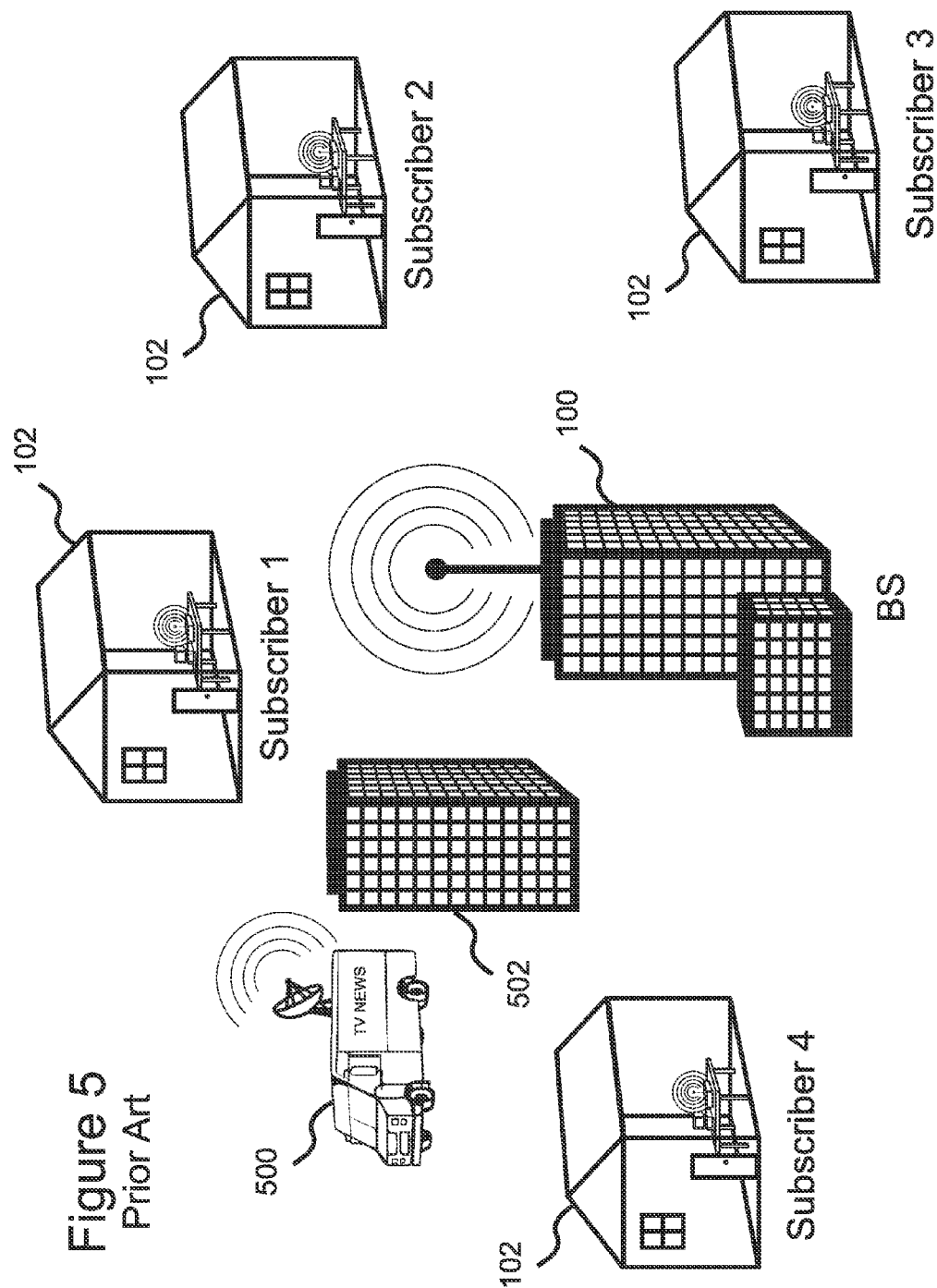
FIG. 5 illustrates a television news van blocked from detection by a base station due to an intervening building, but detectable by two nearby subscribers.
Figure 6:
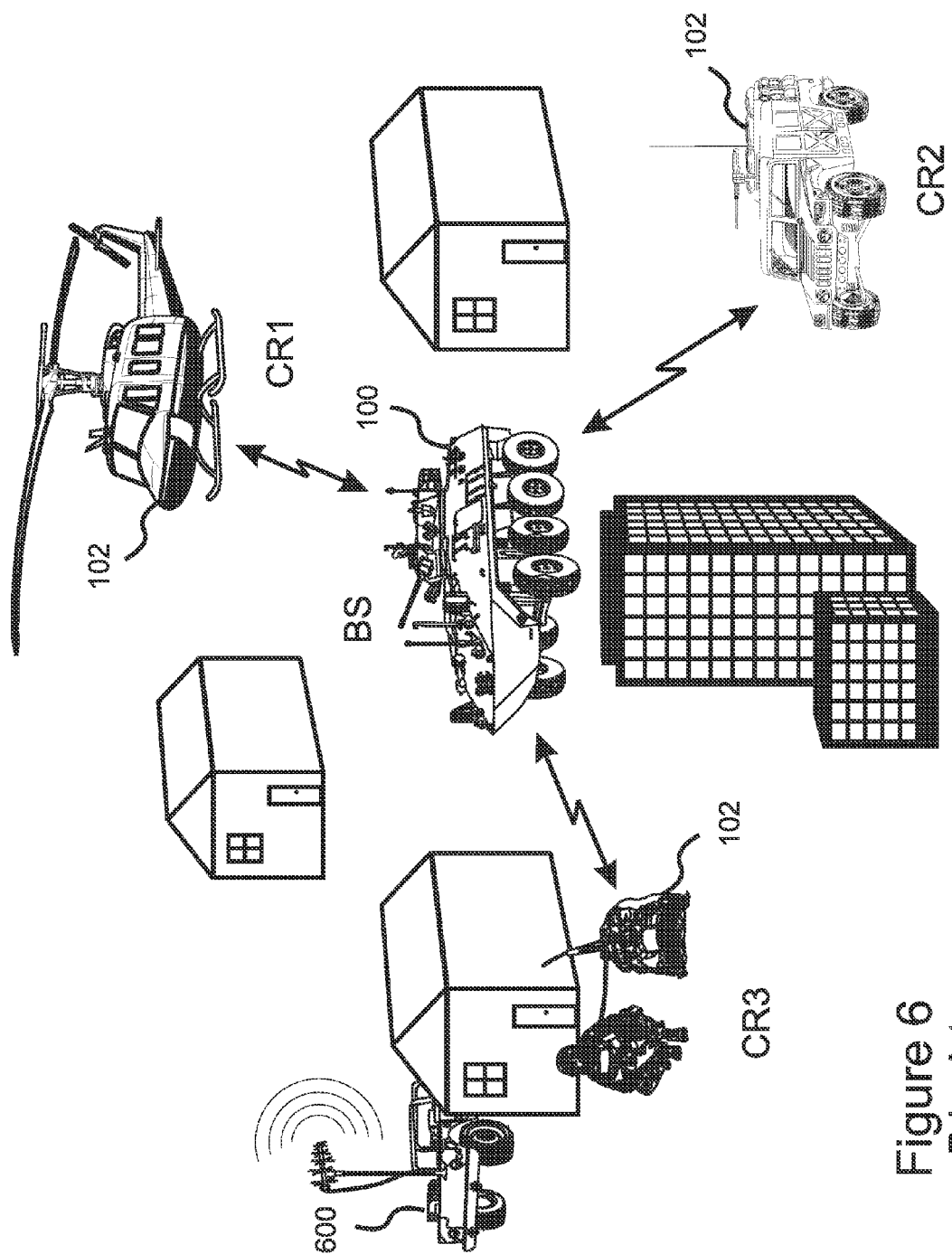
FIG. 6 illustrates a WRAN subjected to a denial of service attack while in use during a combat operation.
Figure 7A:
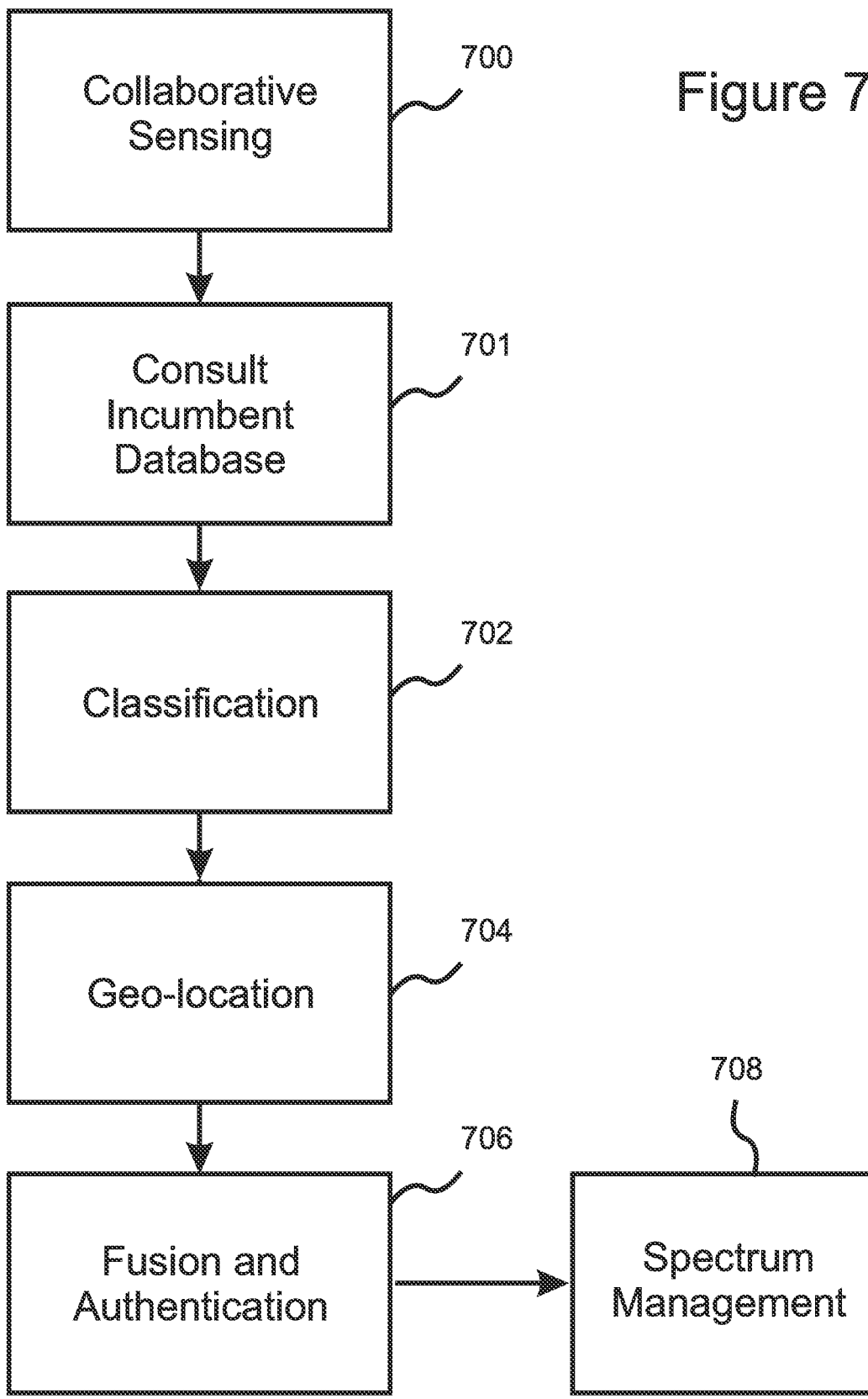
FIG. 7A is a flow diagram illustrating basic steps of an embodiment of the present invention.

With reference to FIG. 7A, the present invention is a method for improving the detection and verification of incumbent signals in a WRAN environment while providing protection against disruption of the WRAN by spurious signals and denial of service attacks. The invention includes the steps of collaborative sensing 700 of the radio environment by the base station 100 and the SPE's 102, collectively referred to as the "nodes" of the WRAN, and authenticating valid incumbent signals based on fusion 706 of the information reported by the nodes. A spectrum manager 708 then determines which channels are to be used by the WRAN based on the authentication results.

FIG. 7A illustrates the basic steps in an embodiment of the present invention. After collecting sensing and location information from all of the nodes 700, including location information, the signal authenticator consults a database so as to determine if any of the nodes lies within a protected region assigned to a known incumbent that is expected to be broadcasting. If so, then appropriate action is taken by the spectrum manager 708 regardless of whether or not a candidate signal has been detected. Otherwise, if a candidate signal has been detected, the signal authenticator attempts to classify the candidate signal 702, for example as a television broadcast, a radio signal, a wireless microphone signal, and such like, based on at least one detected feature of the candidate signal. The detected feature can be the center frequency, signal strength, bandwidth, rise time, fall time, modulation, and pulse-width, as well as a statistical feature such as a mean, variance, or standard deviation, or a higher order statistic such as a moment, a cumulant, a higher order spectrum coefficient, and such like.

In various embodiments, geo-location 704 is then applied by considering the pattern of signal detection by the plurality of nodes, so as to estimate the location and broadcast range of the candidate signal. In some of these embodiments, the locations of the subscribers are provided to the base station in a database. In other embodiments, each subscriber includes a location determining mechanism such as a GPS locator, and each subscriber reports its location to the base station at the time the subscriber registers with the WRAN.

Having obtained the location of each reporting node in the WRAN, the signal authenticator then compares this geo-location information 704 with locations and/or broadcast ranges of incumbents known to be active in the region, and/or with broadcast ranges and other typical characteristics of known types of valid incumbent. If the candidate signal has been classified, the geo-location results are compared for consistency with the classification of the candidate signal. For example, if the center frequency of a candidate signal indicates that it is a television broadcast, but the signal is only detected by a few nodes in the WRAN and therefore can be assumed to have a very limited broadcast range, this will reduce the likelihood that the candidate signal as an incumbent. This is discussed in more detail below with reference to FIGS. 8C and 8D.

Fusion 706 is also employed in certain embodiments so as to better discriminate weak but valid signals from spurious noise by considering the consistency with which the candidate signal is detected by the nodes. In some embodiments, the fusion is based at least in part on a "voting" rule whereby a signal must be detected by a specified fraction of the detecting nodes before it is considered to be a valid incumbent. The behavior of such a voting rule can be characterized as follows.

Consider a group of N localized sensors associated with nodes of a WRAN, monitoring a specific area. Let k be the number of these sensors that detect a transmitter present in a frequency band. To decide when to declare a transmitter present, a collaborative sensing voting rule is defined. The rule has one parameter, the voting threshold T, a number between 0 and 1, which can be expressed as a percentage. For example, T=0.5 is a threshold of 50%. The rule declares the signal to be present if d≥TN nodes detect its presence. Under this formulation, the AND rule is T=1, the OR rule is 0<T≤1/N, and the general case Voting rule is T=f To evaluate the rule, suppose that all detectors can detect the signal of interest with probability $P_d$, and false alarm $P_f$, the two probabilities being independent of each other. The probability of k successes from N transmitters is then given by the binomial distribution, $$B(k, N; P_d) = \frac{N!}{k!(N-k)!}(P_d)^k(1-P_d)^{N-k}. \quad (1)$$

The voting rule then declares the signal of interest is present with probability:

$$Q_D^{collaborative} = \sum_{k \geq TN}^{N} B(k, N; P_d). \quad (2)$$

The probability of the rule declaring no transmitter present is $1-Q_D^{collaborative}$. If a transmitter is actually present, then $Q_D$ represents the true detection rate and $1-Q_D$ represents the missed detection rate.

If a transmitter is not present then $Q_f$ represents the false positive rate and $1-Q_f$ represents the true negative rate, where $$C(k, N; P_f) = \frac{N!}{k!(N-k)!}(P_f)^k(1-P_f)^{N-k} \quad (3)$$

and $$Q_f^{collaborative} = \sum_{k \geq TN}^{N} C(k, N; P_f). \quad (4)$$

Note that N independent measurements are assumed. If sensors are dense and collocated, the number of independent sensor measurements can be much less than the number of sensors.

In various embodiments, confidence metrics, or weighting factors are applied to the sensed results based on signal classification results, or on the locations of the nodes, so as to collaboratively make a decision if a candidate detected signal is authentic. In some embodiments, the weighting rule is described by $$Q_D^{collaborative} = w_k \sum_{k \geq TN}^{N} B(k, N; P_d) \quad (5)$$

where the weighting factors represent the importance given to the probability of detection from k out of N sensors. In some embodiments, the weighting factors are chosen according to the simple rule where, $$\sum_k w_k = 1 \quad (6)$$

In other embodiments, the results from different nodes are weighted based on a metric such as the "Confidence Metric" coming from the different nodes themselves. In these embodiments, based on the confidence with which the node detects and classifies the signal (i.e. based upon how well the analog features of the detected signal match the known authentic signal), each of the nodes generates a Confidence Metric which can range from 0 (no confidence) to 1 (full confidence). The BS obtains this information from each of the various nodes and combines the information to obtain the final Collaborative Probability of Authentic Signal Detection as $$Q_D^{collaborative} = \sum_k w_k CM_k \quad (7)$$

where $w_k$ is the weights associated with the Confidence Metric ($CM_k$) coming from each of the users k. If the $Q_D^{Collaborative}$ exceeds a certain threshold, then the signal authenticator determines that the detected signal is indeed authentic.

Figure 10:
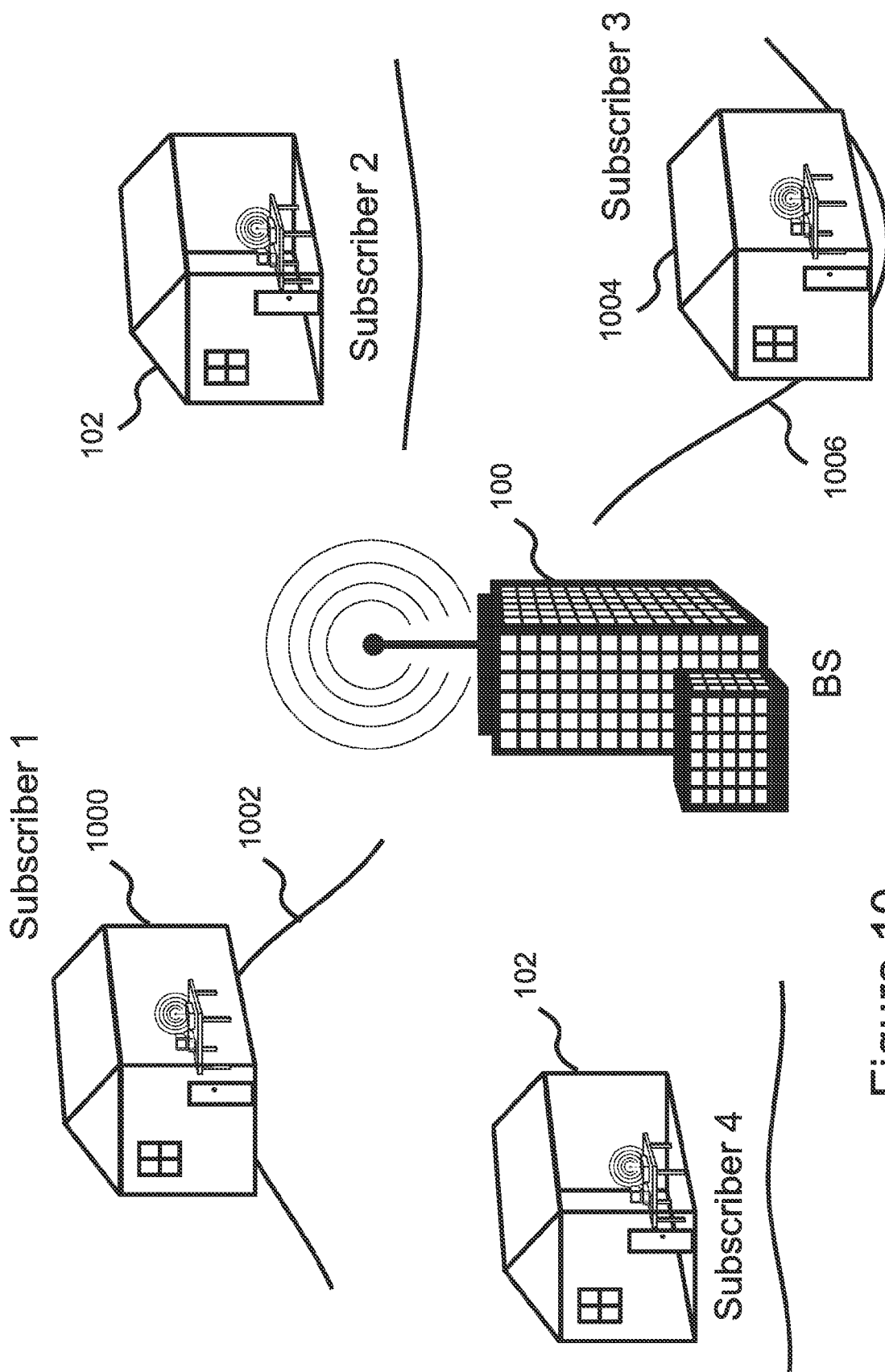
FIG. 10 illustrates a WRAN wherein the signal authenticator applies weighting factors to reported bandwidth sensing data based on local subscriber topology before determining if a detected signal originates from a valid incumbent.

In still other embodiments the results are weighted based on the locations of the nodes. The nodes that are likely to be close to a source of the detected candidate signal may be given a higher weight than nodes that are further away. The surrounding topology of at least some of the nodes can also be considered, since node elevation and/or other surrounding features of a node will affect the strength with which a signal is detected. For example, as illustrated in FIG. 10, a first subscriber 1000 located on a hill 1002 will generally detect a signal with greater strength than a second subscriber 1004 located in a valley 1006 at an equal distance from the source. By correcting for these effects, a signal authenticator can estimate the location and broadcast range of a source with greater accuracy.

It will be clear to one of average skill in the art that weighting factors can be assigned to nodes based on a combination of the factors described above.

Figure 9A:
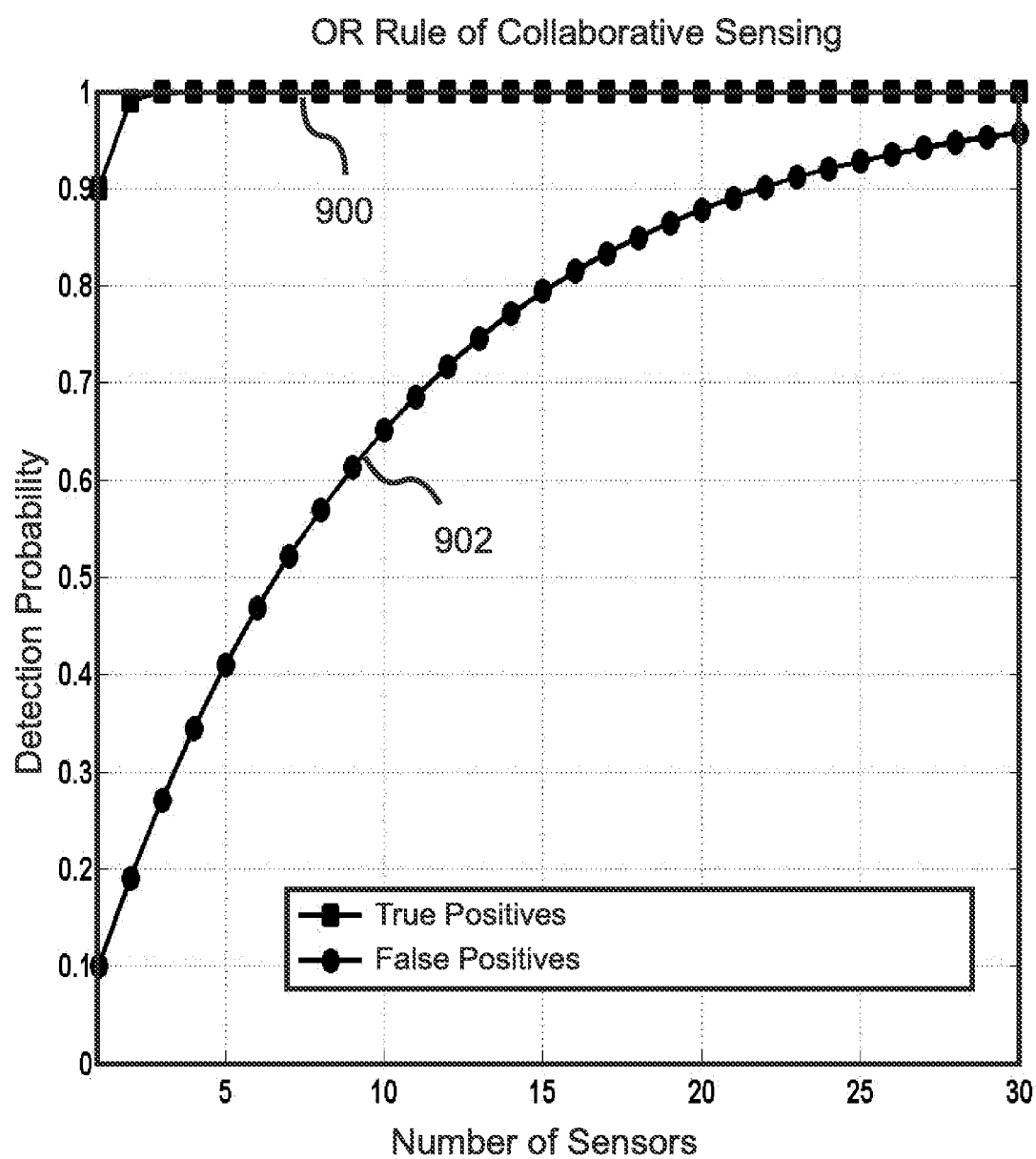
FIG. 9A is a plot of true and false positives as a function of number of sensing nodes for a signal authenticator using an "OR" voting rule.
Figure 9B:
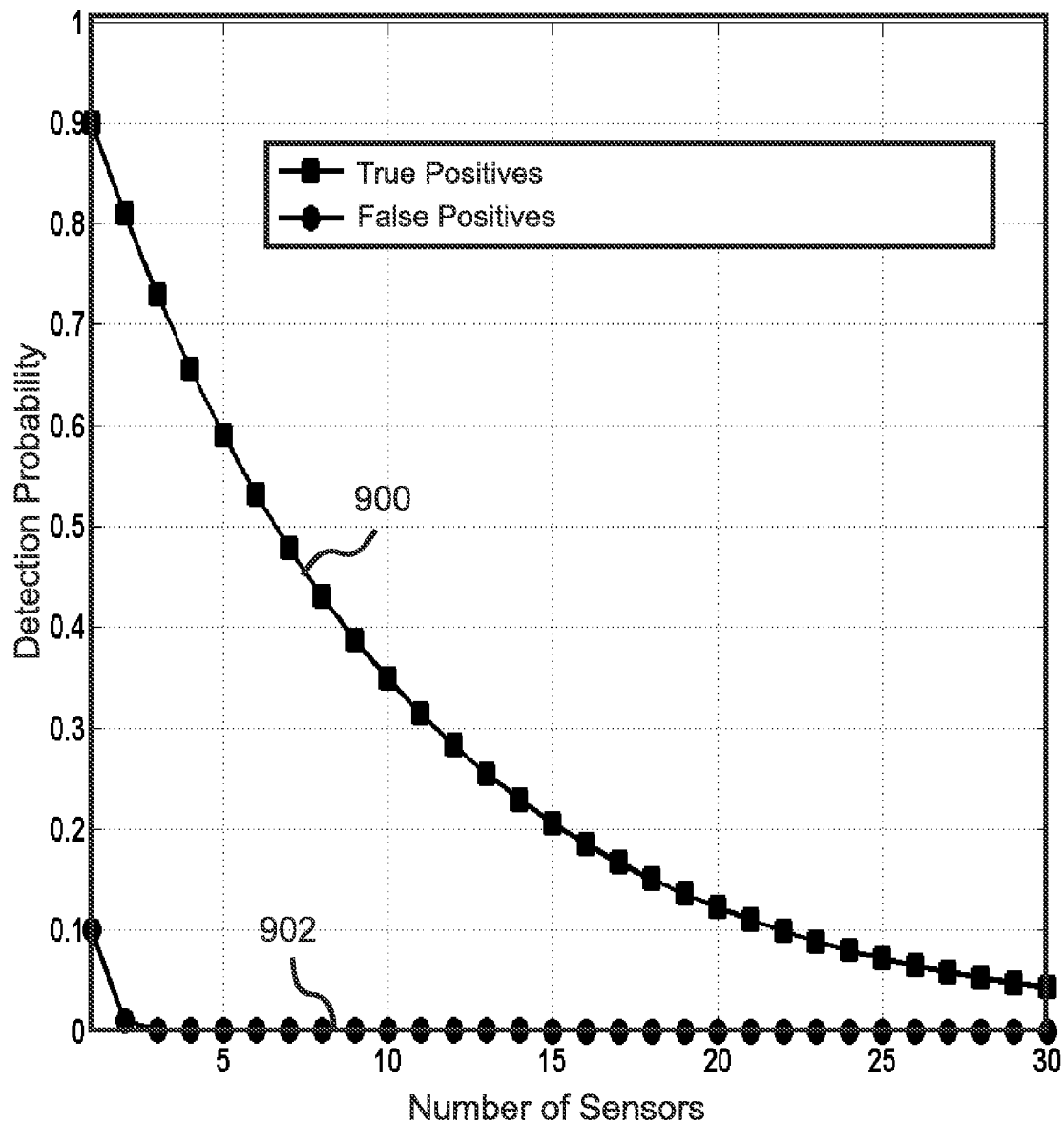
FIG. 9B is a plot of true and false positives as a function of number of sensing nodes for a signal authenticator using an "AND" voting rule.
Figure 9C:
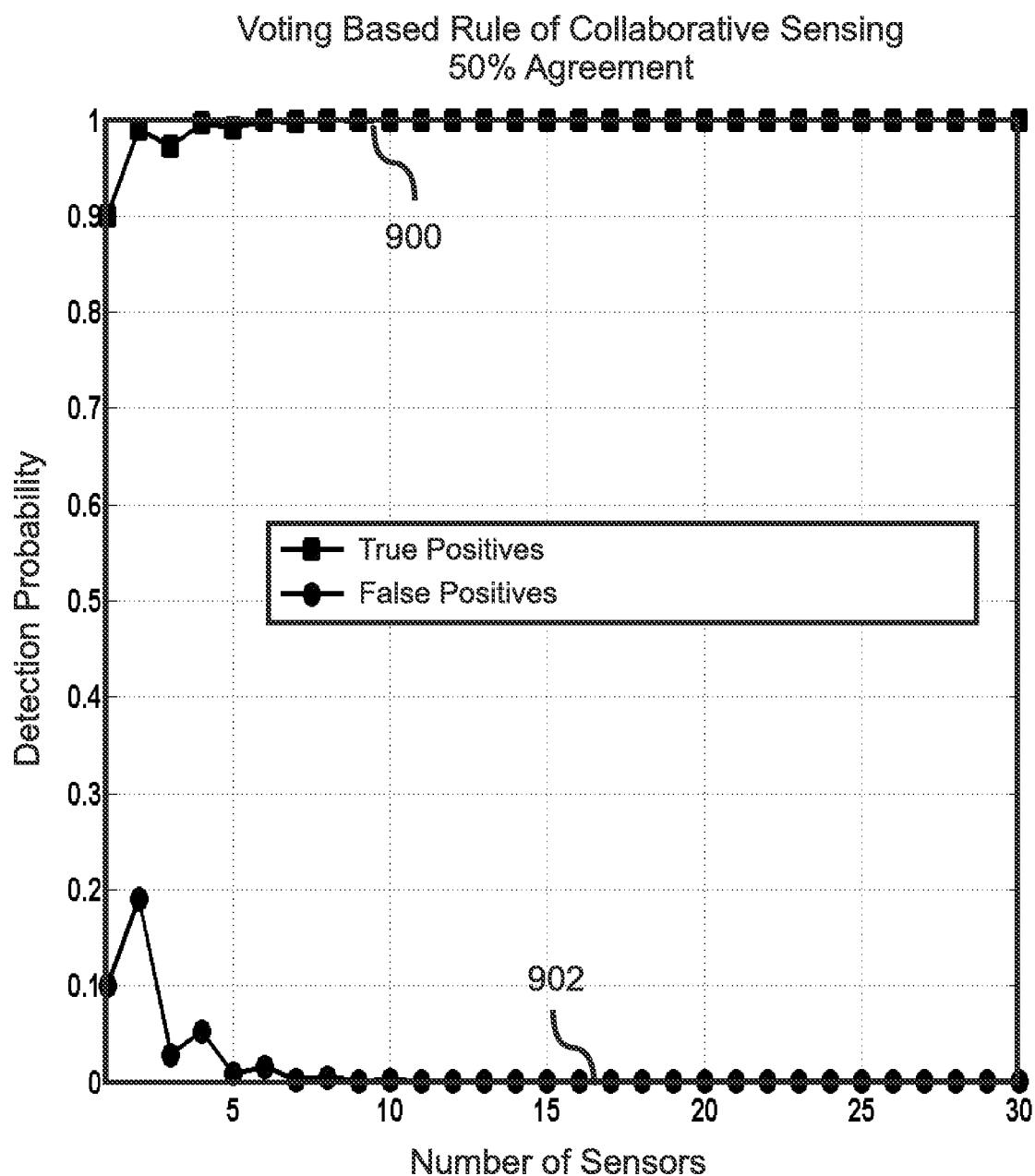
FIG. 9C is a plot of true and false positives as a function of number of sensing nodes for a signal authenticator using a 50% threshold voting rule.

The voting rules can be evaluated using typical data as specified in the 802.22 standard: $P_d$=0.9 and $P_f$=0.1. The results are shown in FIGS. 9A, 9B, and 9C for the OR, AND, and T=0.5 voting rules, respectively. With the OR rule, false positives increase 902 with the number of detectors while with the AND rule true positive performance suffers 900 as the number of independent observations from the detectors increases. It can be seen that the T=0.5 voting rule (FIG. 9C) performs much better for true positives 900 as well as false positives 902. For the T=0.5 voting rule case, probability of detection for true and false positives performs well when the number of sensors is greater than 5.

The T=0.5 voting rule can similarly perform well in the presence of a false signal of spurious or malicious origin that affects a limited number, L, of detectors. As the number of independent detectors increases, these L detectors will be overruled by the detection results from other detectors. Hence collaborative sensing with information fusion and authentication based on a voting rule can help to enhance WRAN discrimination between a valid incumbent and a spurious or malicious signal, thus enhancing resistance of the WRAN to DoS attacks.

In various embodiments, the collaborative sensing by the plurality of nodes in the WRAN includes detecting and reporting at least one analog property of each candidate signal. In some of these embodiments, the analog property is an average signal amplitude, a signal bandwidth, a frequency standard deviation, a rise time, a fall time, a modulation, an amplitude or a frequency variance, or a pulse-width, a statistical feature such as a mean, a variance, or a standard deviation, or a higher order statistic such as a moment, a cumulant, or a higher order spectrum coefficient. The signal authenticator then compares this information with a database 701 containing properties of incumbents known to be active in the region, and/or generally known properties of valid types of incumbent, so as to improve the confidence with which the candidate signal is authenticated or rejected. This is discussed in more detail below in reference to FIGS. 8A and 8B.

Figure 7B:
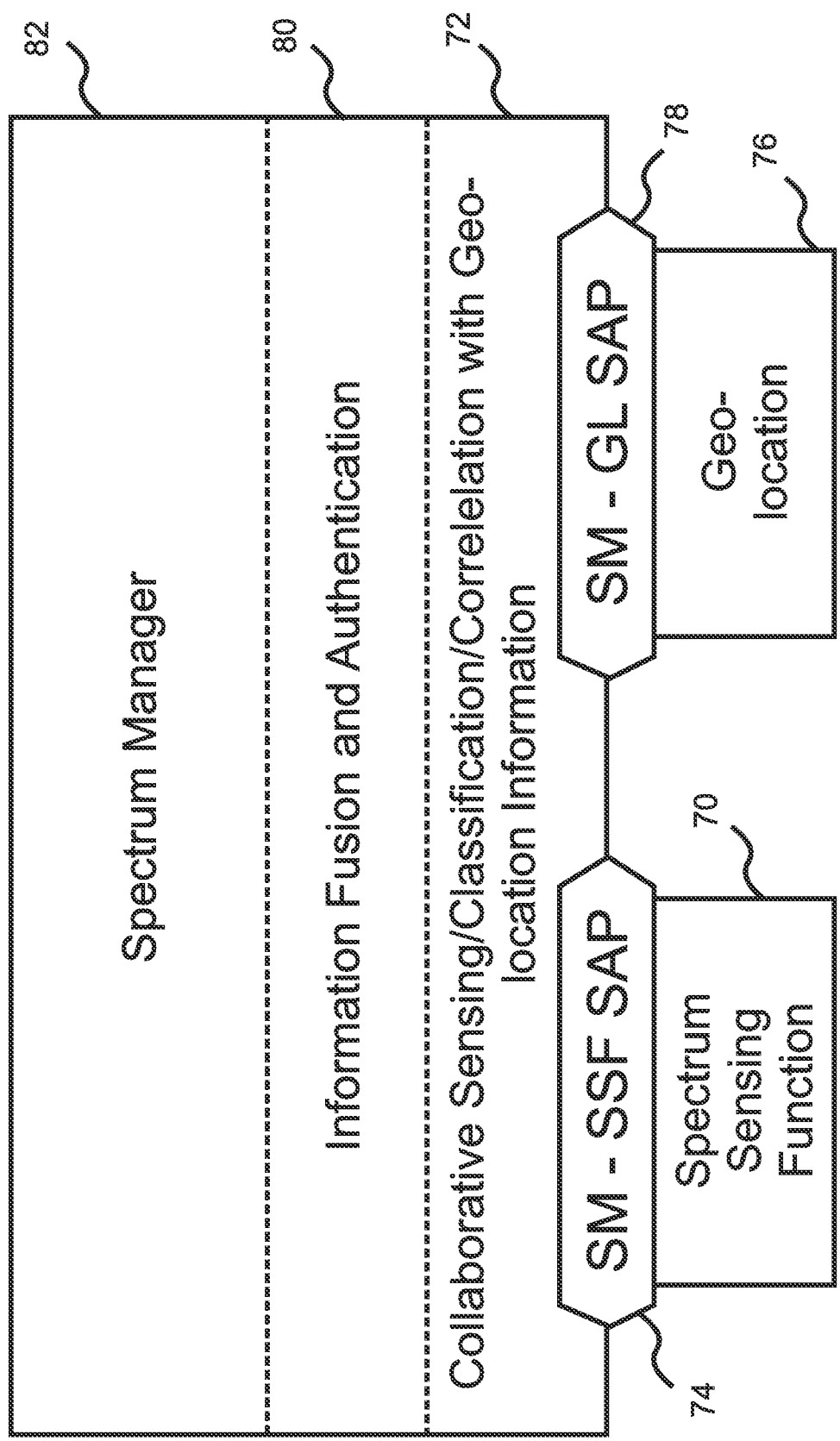
FIG. 7B is a structural diagram of a computing architecture that is able to carry out an embodiment of the present invention.

FIG. 7B illustrates a computing architecture that is able to carry out embodiments of the present invention. A spectrum sensing function ("SSF") 70 communicates with a classification module 72 through a spectrum management-spectrum sensing service access point ("SM-SSF SAP") 74. Similarly, a geo-location function 76 communicates with the classification module 72 through a spectrum management-geo-location service access point ("SM-GL SAP") 78. After classification, information sensed by the nodes of the WRAN is compared and "fused" by a fusion and authentication module 80 so as to determine if a candidate signal is a valid, authentic incumbent, after which the spectrum manager 82 takes appropriate action, for example de-authorizing nodes that conflict with a valid incumbent or switching the WRAN to a different frequency channel.

Figure 7C:
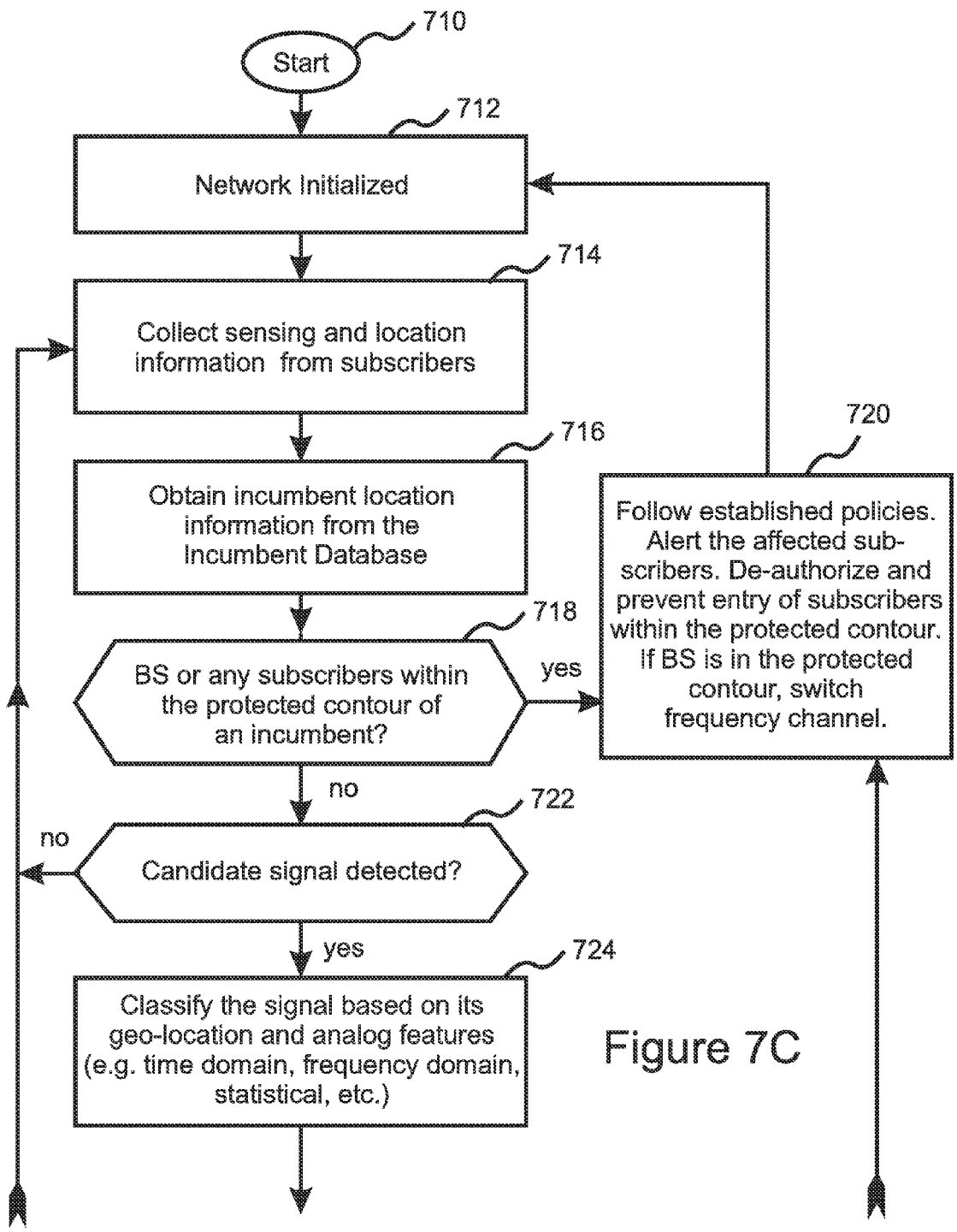
FIG. 7C is a flow diagram illustrating detailed steps of the embodiment of FIG. 7A.
Figure 7C:
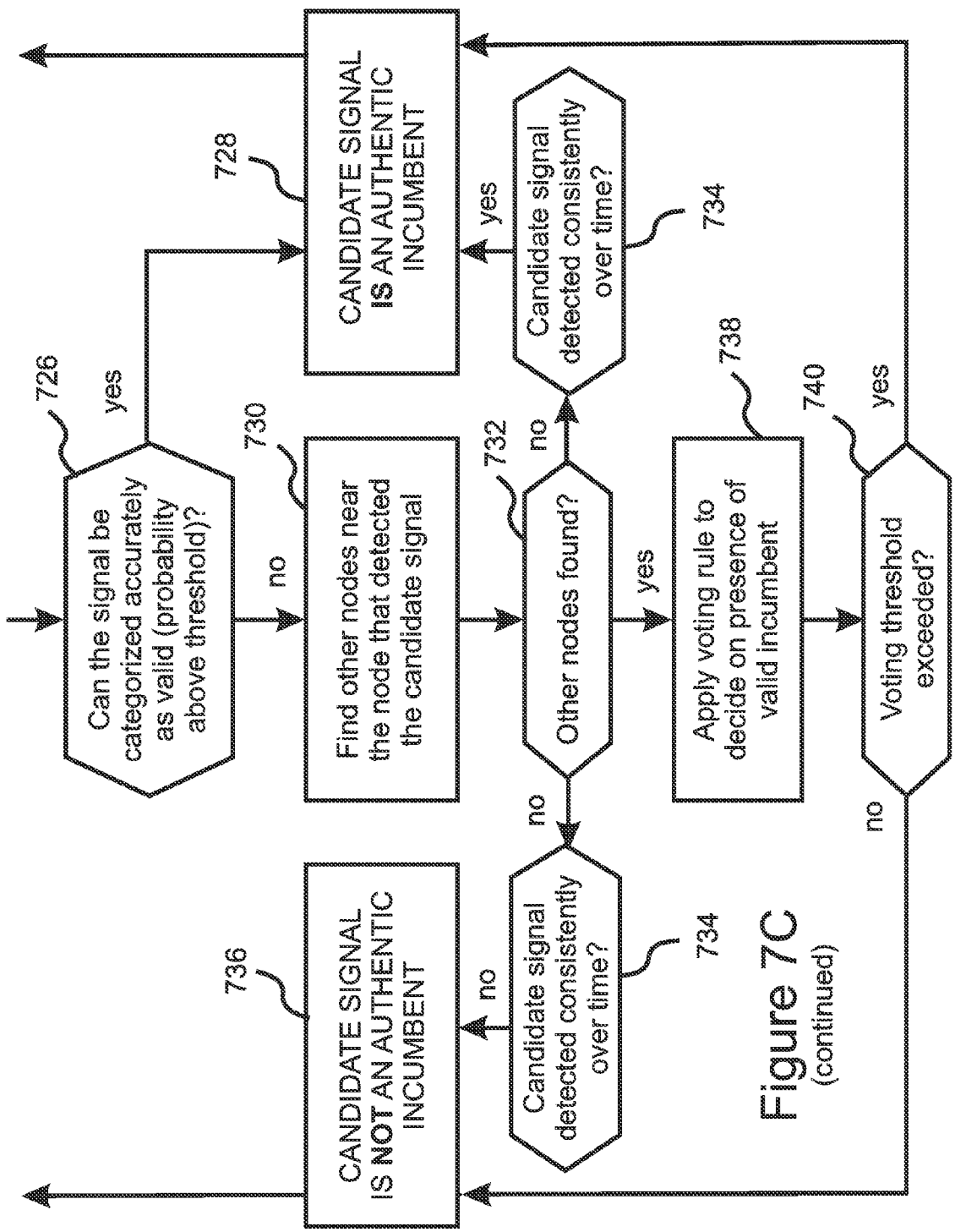

FIG. 7C illustrates in detail a specific embodiment of the present invention. The method begins 710 with initialization of the WRAN 712, after which sensing information is collected 714 from all of the nodes in the network, including both the base station 100 and all of the subscribers 102. In some embodiments, the signal authenticator and/or the spectrum manager are co-located with the base station. In the embodiment of FIG. 7C, the nodes include GPS location determining apparatus, and they report their locations 714 as they register with the base station 100 and join the network.

Having determined the locations of the nodes, the spectrum manager consults an incumbent database 716 so as to determine 718 if any of the nodes lies within a protected region assigned to an active incumbent. If so, then the spectrum manager follows an established policy 720. The spectrum manager may alert the affected subscribers and "de-authorize" them by requiring them to leave the network. Or the spectrum manager may switch at least the affected nodes to another frequency channel. The spectrum manager will typically also refuse to allow nodes to join the network if they lie within a protected region. If the base station and/or too many of the nodes lie within a protected region, the spectrum manager may decide to switch the entire WRAN to a different channel or to a plurality of channels, and re-initialize the network 712.

If the database indicates that the channel should be available for all nodes in the network, the spectrum manager then reviews the sensing data reported by the nodes so as to determine if any candidate signals have been detected 722. If so, then for each detected candidate signal the signal authenticator attempts to categorize the signal as either an authentic incumbent signal 728 or as not an authentic incumbent signal 736.

The signal authenticator begins by attempting to classify the candidate signal 724 based on geo-location information and analog features detected by the nodes, such as center frequency, amplitude, frequency standard deviation, amplitude standard deviation, bandwidth, pulse-width, modulation, statistical features such as mean, variance, and/or standard deviation, higher order statistics such as moments, cumulants, and/or higher order spectrum coefficients, rise time, fall time, and such like. If the classification provides a sufficient basis for categorizing the signal 726 as a valid incumbent 728, then appropriate action is taken 720. If not, then the signal authenticator looks for other nodes that have detected the same candidate signal 730. If no more detecting nodes are found, the signal authenticator categorizes the candidate signal as a valid incumbent 728 or not a valid incumbent 736 according to whether or not the signal is detected consistently over time 734. If more detecting nodes are found 732, a voting rule is applied 738, and the signal is categorized according to whether or not the voting threshold is exceeded 740.

Figure 8A:
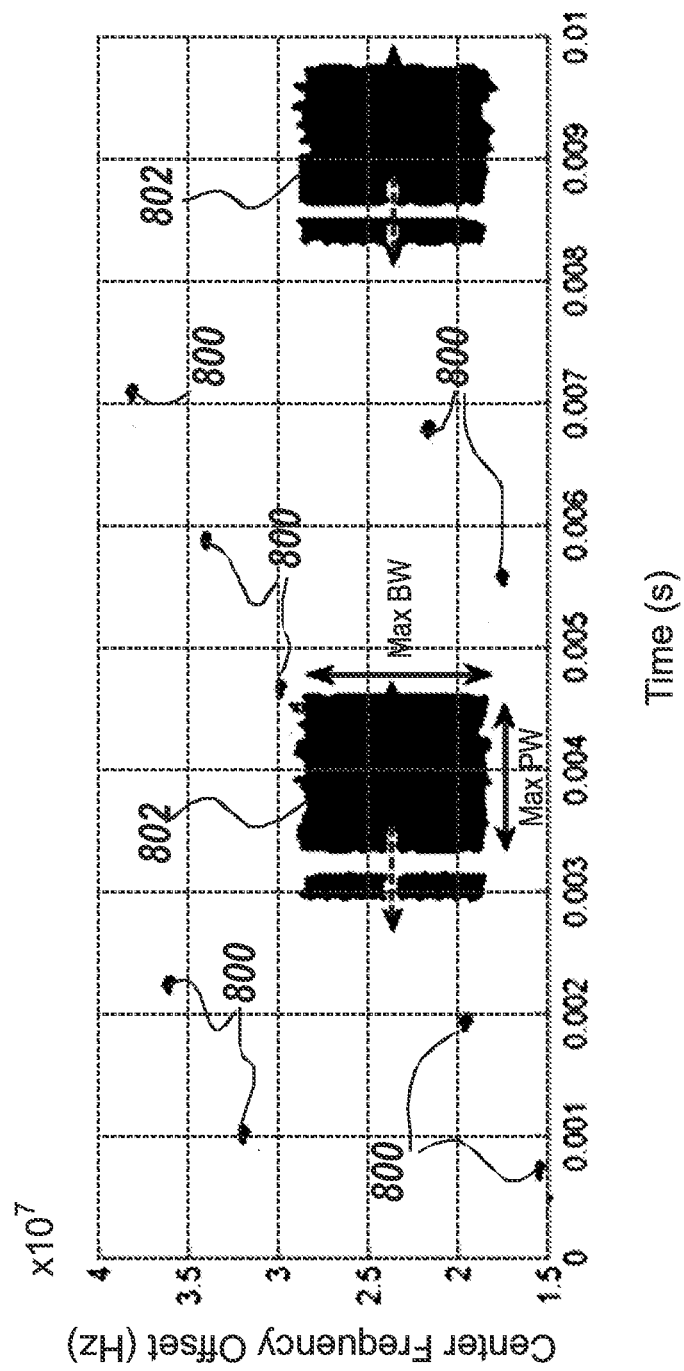
FIG. 8A is a graph illustrating analog features sensed within the frequency environment of a node in a WRAN.

FIG. 8A presents an example of sensing information reported by a node of a WRAN to the signal authenticator 700, 714. In this example, signals are collected as a function of time over a range of frequencies offset from a microwave carrier frequency. At least two types of candidate signal are detected. One of the candidate signals 800 has very short pulse widths, small bandwidths, and a wide variance of center frequencies. The other candidate signal type 802 has longer pulse widths, larger bandwidths, but no detectable variance of center frequency. In similar embodiments, amplitudes and/or amplitude variations of candidate signals would also be sensed and analyzed.

Figure 8B:
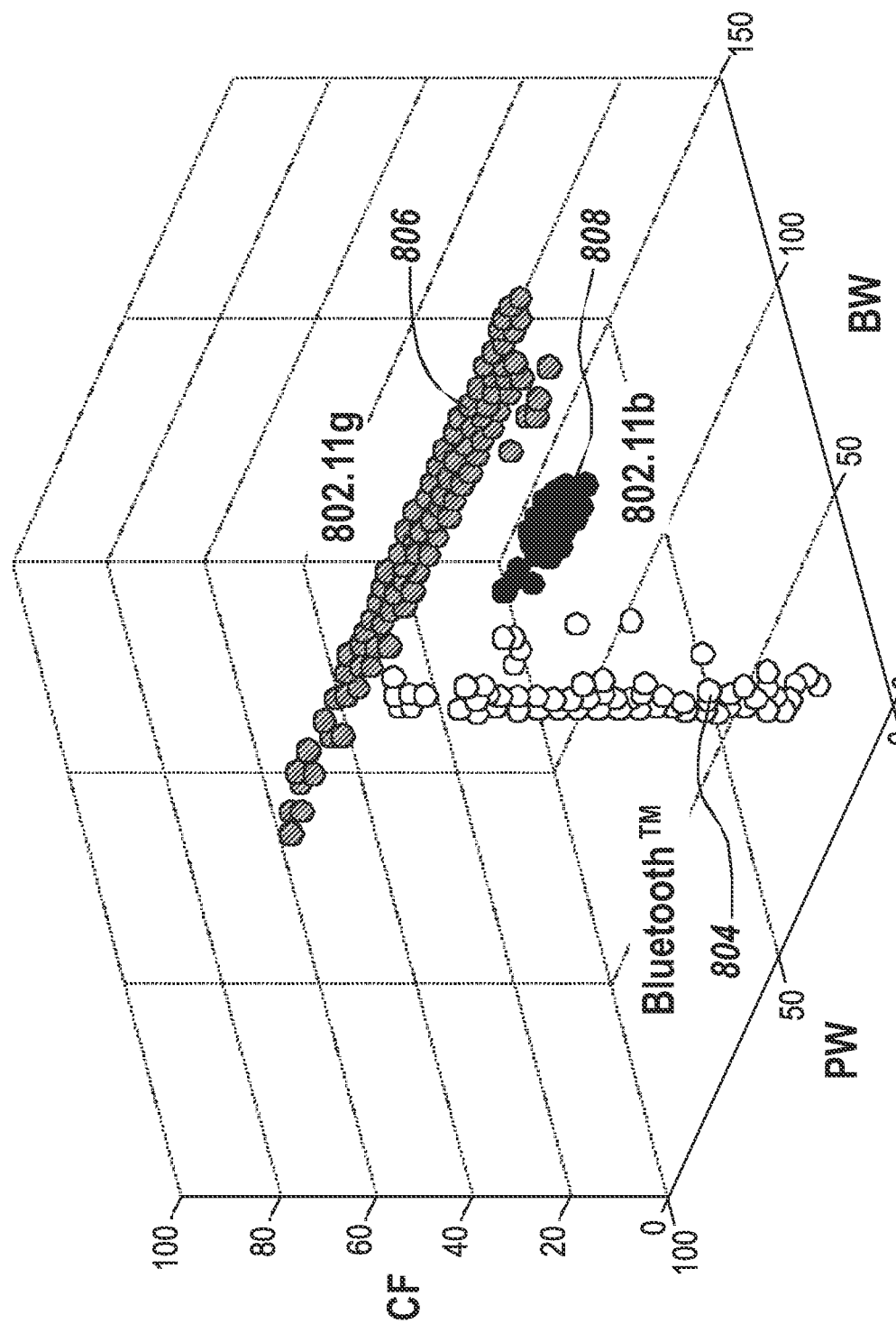
FIG. 8B is a three-dimensional graph comparing analog features of different known types of authentic incumbent.

FIG. 8B illustrates classification of candidate signals 702, 724 according to sensed features such as frequency variance, pulse width, and bandwidth. As illustrated in the figure, Bluetooth signals are known to have small pulse widths and bandwidths, but a wide range of frequencies, while 802.11g signals 806 are known to have larger bandwidths and a wide range of pulse widths, and 802.11b signals 808 have large bandwidths but an intermediate range of pulse widths. On this basis, the first candidate signal 800 of FIG. 8A can be tentatively classified as a Bluetooth 804 signal, and the second candidate signal 802 can be tentatively classified as an 802.11b (808) signal. Since Bluetooth has a much smaller broadcast range than 802.11b, geo-location could then potentially be used to confirm the classifications and strengthen confidence that the candidate signals 800, 802 are authentic and not spurious or malicious.

Figure 8C:
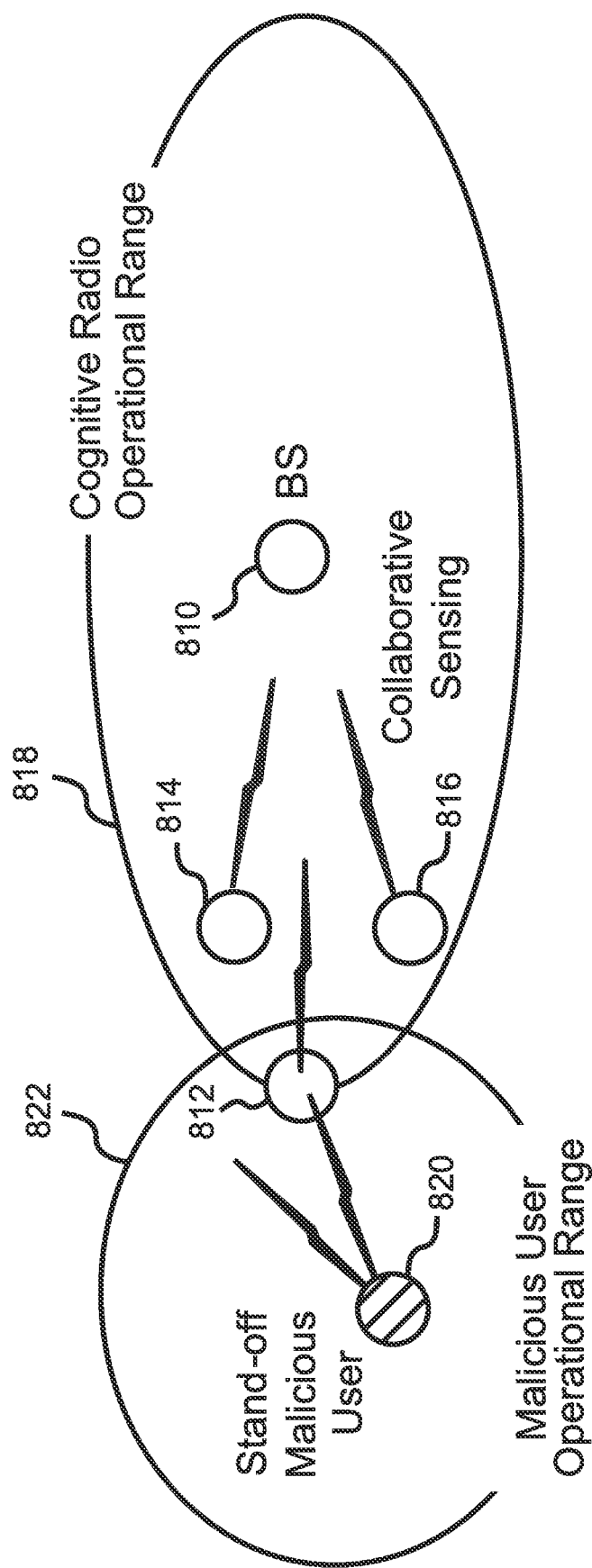
FIG. 8C illustrates use of collaborative sensing and geo-location to recognize an invalid signal due to a detected signal transmission range being inconsistently small as compared to the classification of the signal.

FIG. 8C illustrates the use of geo-location to test the classification of a candidate signal. A base station 810 is in communication with a plurality of subscribers 812, 814, 816 in a WRAN. However, a malicious transmitter 820 is attempting to obstruct the WRAN by transmitting signals on all available channels, thereby launching a denial of service ("DoS") attack by attempting to create a false impression that all frequencies are currently in use by valid incumbents. The malicious transmitter 820 is not able to saturate the entire region of the WRAN 818 with malicious signals, but instead is using a small, portable transmitter with a limited broadcast range 822 that is only able to reach one of the nodes 812 in the WRAN. Due to center frequencies and other features, the sensing node 812 is able to classify as least some of the candidate signals received from the malicious source as being apparent wide area broadcasts such as television broadcast signals. However, fusion of the data obtained from all of the nodes 812, 814, 816 allows the signal authenticator 80 to determine that the apparent broadcast ranges of these candidate signals are too small to be consistent with wide area broadcasts. This contradiction allows the signal authenticator 80 to correctly categorize the candidate signals as invalid, and the spectrum manager 82 accordingly continues to use the available frequencies. The result is that, at most, only the node 812 which is in range of the malicious source 820 is affected by the attack.

Figure 8D:
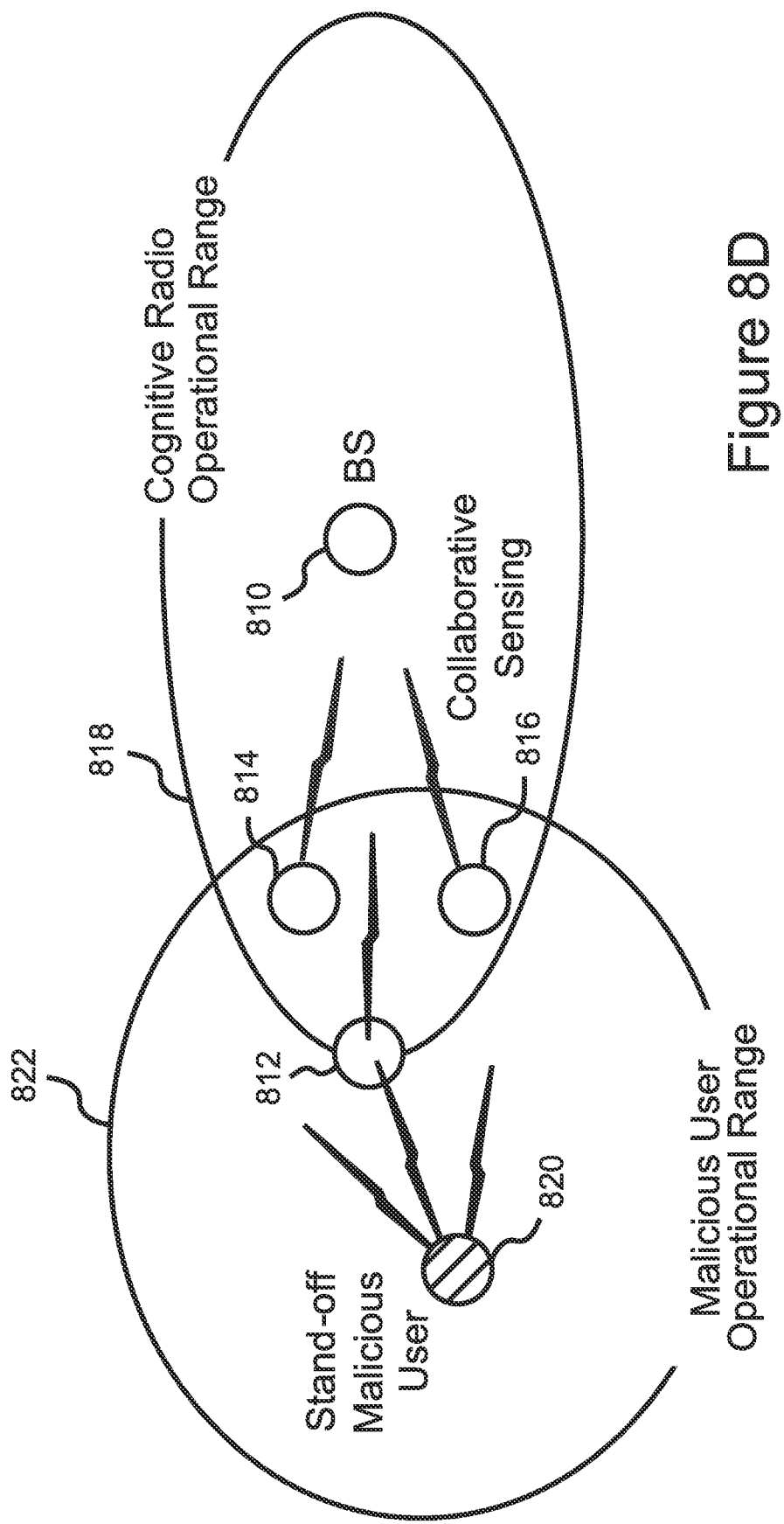
FIG. 8D illustrates use of collaborative sensing and geo-location to recognize an invalid signal due to a detected signal transmission range being inconsistently large as compared to the classification of the signal.

FIG. 8D presents a similar example of testing the classification of a candidate signal by geo-location sensing, except that in this example the malicious source 820 is transmitting what appears to be a wireless microphone. However, a wireless microphone has a maximum range of 4 km, and the signal is detected by several of the WRAN nodes 812, 814, 816 over a range of locations that extends much further than 4 km. Accordingly, the signal authenticator 80 correctly concludes that the signal is invalid, and the spectrum analyzer 82 takes appropriate action.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for categorizing a candidate signal that is an apparent incumbent signal detected by at least one node of a wireless cognitive radio network ("WCRN") as one of a valid authentic incumbent signal from an incumbent user that is not part of the WCRN and an invalid, non-authentic signal, the method comprising:

each of a plurality of nodes in the WCRN sensing its surrounding frequency environment;

each of the plurality of nodes preparing a sensing report at least reporting if the candidate signal has been detected;

each of the plurality of nodes conveying its sensing report to a signal authenticator;

the signal authenticator categorizing the detected candidate signal as a valid authentic incumbent signal if an evaluation of the sensing reports indicates that the candidate signal is a valid authentic incumbent signal; and the signal authenticator categorizing the detected candidate signal as an invalid, non-authentic signal if the evaluation of the sensing reports indicates that the candidate signal is an invalid, non-authentic signal, where an invalid, non-authentic signal is a signal that is at least one of spurious and malicious; a valid, authentic incumbent signal is a signal that is neither spurious nor malicious and is transmitted by an authorized user that is not part of the WCRN; and the evaluation of the sensing reports includes a synthesis of information from at least two of the sensing reports, said synthesis including a combination or comparison of the at least two sensing reports with each other.

2. The method of claim 1, wherein for each of the plurality of nodes in the WCRN, sensing its surrounding frequency environment includes sensing at least one analog property of each detected signal, and preparing a sensing report and conveying its sensing report includes conveying the at least one analog property to the signal authenticator.

3. The method of claim 2, wherein the analog property is one of:
- a signal amplitude;
- a signal bandwidth;
- a signal standard deviation;
- an amplitude variance;
- a mean;
- a variance;
- a standard deviation;
- a moment;
- a cumulant;
- a high order spectrum coefficient;
- a frequency variance;
- a rise time;
- a fall time;
- a modulation;
- a pulse width; and
- a pilot signal.

4. The method of claim 2, wherein categorizing the detected candidate signal includes comparing the at least one analog property with a corresponding property of at least one of a known incumbent and a known type of incumbent.

5. The method of claim 1, wherein categorizing the detected candidate signal includes categorizing the detected candidate signal as a valid incumbent signal if at least a specified percentage of the sensing reports report that the candidate signal has been detected.

6. The method of claim 5, wherein the specified percentage is 50%.

7. The method of claim 1, wherein a physical location of at least one of the plurality of nodes is known by the signal authenticator, and is included in the evaluation of the sensing reports.

8. The method of claim 7, wherein the physical location of the at least one node is known to the signal authenticator due to accessing by the signal authenticator of a database containing the physical location of the at least one node.

9. The method of claim 7, wherein the physical location of the at least one node is reported to the signal authenticator by the at least one node.

10. The method of claim 9, wherein the physical location of the at least one node is determined by the at least one node using a geo-location apparatus at least cooperative with the at least one node.

11. The method of claim 10, wherein the geo-location apparatus is a global positioning system apparatus.

12. The method of claim 7, wherein the physical location of the at least one node is compared with a detected candidate signal strength reported to the signal authenticator by the at least one node, the comparison being used by the signal authenticator to estimate a geographic characteristic of a source of the candidate signal, the geographic characteristic being one of a candidate source location and a candidate source broadcast range.

13. The method of claim 12, wherein the evaluation of the sensing reports includes at least one of:
- comparing the estimated candidate source location with a source location of a known valid incumbent;
- comparing the estimated candidate source broadcast range with a source broadcast range of a known valid incumbent; and
- comparing the estimated candidate source broadcast range with a source broadcast range of a known type of valid incumbent.

14. The method of claim 1, wherein the evaluation of the sensing reports includes applying a weighting factor to a sensing report conveyed to the signal authenticator by one of the nodes in the WCRN.

15. The method of claim 14, wherein the weighting factor is derived at least partly from at least one of:
- a location of the node;
- a geographic feature applicable to the location of the node;
- a confidence factor reported by the node, the confidence factor being based at least in part on a signal strength with which the candidate signal is detected by the node; and
- a confidence metric reported by the node, the confidence metric being based at least in part on a comparison between an analog feature of the candidate signal detected by the node and a corresponding analog feature known to pertain to a valid type of incumbent.

16. The method of claim 1, further comprising classifying the detected candidate signal as potentially belonging to at least one class of valid incumbent according to at least one detected characteristic of the candidate signal.

17. A method for categorizing a candidate signal that is an apparent incumbent signal detected by a node of a wireless cognitive radio network ("WCRN") as one of a valid authentic incumbent signal from an incumbent user that is not part of the WCRN and an invalid, non-authentic signal, the method comprising:
- a node in the WCRN sensing its surrounding frequency environment;
- the node preparing a sensing report at least reporting that the candidate signal has been detected and reporting a first property and a second property of the candidate signal;
- the node conveying the sensing report to a signal authenticator;
- the signal authenticator assigning to the candidate signal an apparent valid incumbent classification according to the first property;
- the signal authenticator comparing the second property with known properties of the apparent valid incumbent classification;
- the signal authenticator categorizing the detected candidate signal as a valid authentic incumbent signal if the second property is consistent with the known properties of the apparent valid incumbent classification; and
- the signal authenticator categorizing the detected candidate signal as an invalid non-authentic signal if the second property is not consistent with the known properties of the apparent valid incumbent classification,
- where an invalid, non-authentic signal is a signal that is at least one of spurious and malicious; and a valid authentic incumbent signal is a signal that is neither spurious nor malicious, and is transmitted by an authorized user that is not part of the WCRN.

18. The method of claim 17, wherein the first property is one of:
- a signal amplitude;
- a signal bandwidth;
- a signal standard deviation;
- an amplitude variance;
- a mean;
- a variance;
- a standard deviation;
- a moment;
- a cumulant;
- a high order spectrum coefficient;
- a frequency variance;

a rise time;
a fall time;
a modulation;
a pulse width; and
a pilot signal.

19. The method of claim 17, wherein the analysis of the first property includes a comparison between the first property and a corresponding property of at least one of a known valid incumbent and a known type of valid incumbent.

20. The method of claim 17, further comprising classifying the detected candidate signal according to the first property as potentially belonging to at least one class of valid incumbent.

\* \* \* \* \*